Nov. 16, 1943.　　　I. V. DA SILVEIRA　　　2,334,481
TEAT CUP UNIT
Filed March 24, 1942
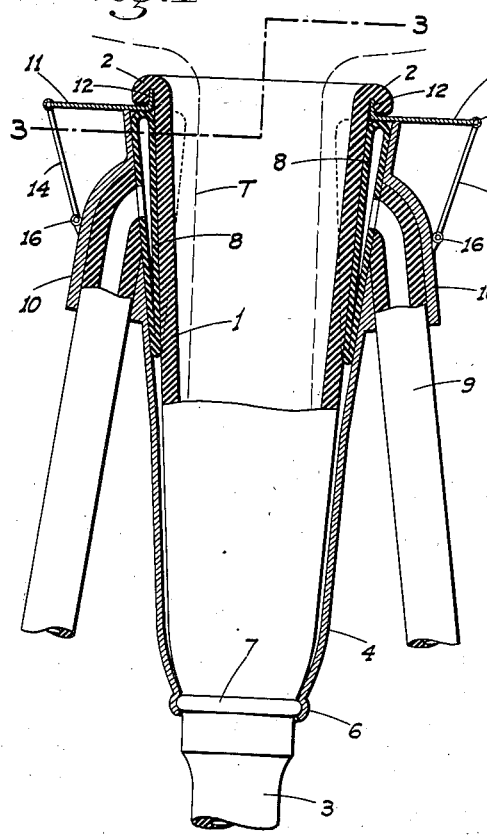
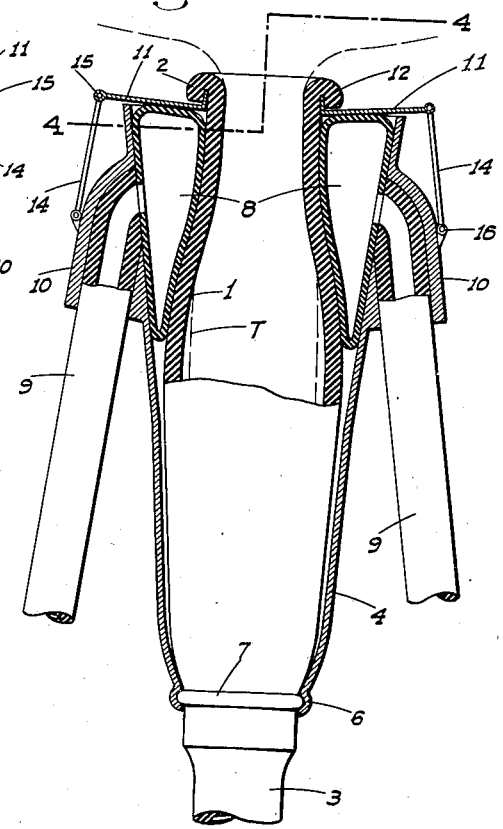
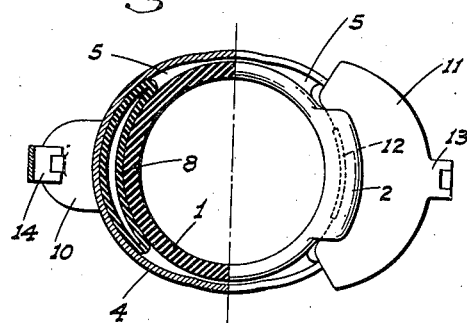
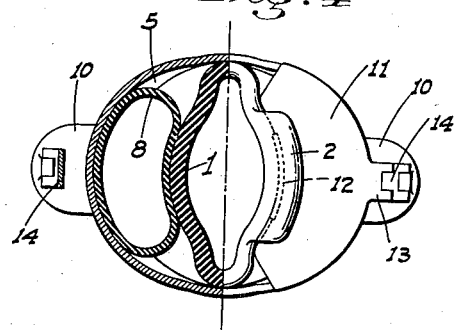
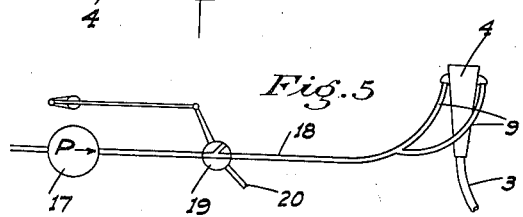
INVENTOR.
I. V. Da Silveira
BY
ATTORNEYS Patented Nov. 16, 1943

2,334,481

UNITED STATES PATENT OFFICE 2,334,481

TEAT CUP UNIT

Isauro V. Da Silveira, Lodi, Calif.

Application March 24, 1942, Serial No. 435,939

5 Claims. (Cl. 31—85)

This invention relates generally to automatic milking apparatus, and in particular the invention is directed to, and it is my principal object to provide, a teat cup unit of novel design and which is adapted to be actuated by a pressure pulsator rather than a vacuum pulsator as is now the custom.

Another object of the invention is to provide a pressure actuated teat cup unit which is operative to milk a cow with an action more closely resembling hand milking than can be accomplished with vacuum type teat cups.

An additional object of this invention is to provide a teat cup unit arranged so that the teat is not directly subjected to the air pressure from the pulsator, and so that injury to the cow cannot occur should accidental pressure increase occur or should the operator permit the milking operation to continue beyond normal milking time.

It is also an object to construct the unit to permit of ready removal of the deformable teat cup from the remainder of the unit and for the purpose of washing and sterilizing the same.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a side elevation, mainly in section, showing the parts of the unit in the position occupied by the same when the unit is inoperative or as exhausted between pressure pulsations.

Figure 2 is a similar view but shows the parts of the unit during a pressure pulsation.

Figure 3 is a cross section on line 3—3 of Fig. 1.

Figure 4 is a cross section on line 4—4 of Fig. 2.

Figure 5 is a diagrammatic view of the unit connected with a pressure type pulsator.

Referring now more particularly to the characters of reference on the drawing, the numeral 1 indicates an elongated flexible and resilient teat cup, preferably of rubber, which is circular in cross section and preferably tapers gradually from top to bottom; the upper edge of this teat cup being formed with integral outwardly overhanging opposed beads 2 which are deformable with the cup 1. At its lower end the teat cup connects with a length of flexible tubing 3 which leads, as usual, to a fitting on the head (not shown) of the milk bucket.

From a point adjacent but immediately below the bead 2, the teat cup 1 is surrounded by a metallic shell or sheath 4 which generally conforms to the taper of the teat cup, except that the upper half of this sheath is slightly oblong in cross section as shown in Figs. 3 and 4 whereby transversely arcuate, downwardly tapering pockets 5 are formed between opposite sides of the teat cup and corresponding portions of the sheath 4. At its lower end the sheath is formed with a shallow annular channel 6 which faces inwardly and in which an integral ring 7 on the lower end of the cup 1 is removably seated.

Expansible air bags 8, which are wedge shaped in vertical section when inflated, are disposed in pockets 5 with the narrow end lowermost and with the upper end substantially flush with the upper edge of the sheath. Air ducts or tubes 9 lead through the sheath 4 and connect in communicating relation with air bags 8; such tubes 9 leading outward and thence downward, and being protected adjacent the air bags by means of protector sleeves 10 formed rigid with the sheath.

In order to prevent the air bags 8 from blowing out of pockets 5, I provide top plates 11 in overlying relation to said pockets; these plates being generally symmetrical to the engaged parts of the unit, and each at its inner edge having an upturned flange 12 which removably engages between the adjacent bead 2 and cup 1. An ear 13 projects outwardly from each top plate 11 to a point beyond sheath 4, and a link 14 is hinged to each ear at 15 and thence depends to pivotal connection at 16 with the corresponding protector sleeve 10.

In use the tubes 9 are connected in common with a pressure pulsator of the type which provides alternating pressure and exhaust; such an arrangement being shown diagrammatically in Fig. 5. In Fig. 5 the pressure pump 17 feeds to a pipe 18 connected with tubes 9, and a driven, two-way oscillating valve 19 is interposed in pipe 18. This valve functions to alternately feed air pressure to the teat cup unit and then permit the air pressure to exhaust therefrom through a blow-off fitting 20.

With pulsation of the air pressure, as above, the air bags 8 alternately expand to their full wedge shape and then deflate. With such expansion, the flexible and resilient teat cup 1, in the plane of the bags, is squeezed or deformed inwardly from opposite sides to an extent sufficient to apply a milking action to the teat T which depends into said cup. This milking action closely simulates hand milking for the reason that the wedge shape of the bags 8 produces the greatest compression of the teat cup near the udder; the compression of the cup decreasing gradually toward the plane of the lower end of the air bags. This action is clearly shown in Fig. 2.

The top plates 11, being attached to the bead 2 of cup 1, slide back and forth as the upper end of cup 1 is alternately deformed and released; links 14 holding said plates against upward deflection and yet permitting such sliding motion relative to the upper end of sheath 4.

To remove the teat cup 1 from the unit for washing and sterilizing, the flanges 12 are detached from bead 2, and ring 7 released from channel 6, whereupon the cup is drawn out of its sheath 4.

Since the teat T normally fits freely in the cup 1 as indicated in Fig. 1, suitable means is provided to hold the various cups in proper milking position relative to the teats.

Due to the pressure creating construction employed, it will be seen that no air pressure is released into any cup, so that if any cup of the complete assembly is not in use, this does not interfere in any way with the operation and efficient functioning of the remaining cups, since no pressure is lost.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A teat cup unit comprising an elongated teat cup of flexible and resilient material, a rigid sheath surrounding said cup from substantially end to end thereof, the upper portion of the cup being circular in cross section and the corresponding portion of the sheath being shaped to form pockets on opposite sides of the unit between the cup and sheath, a normally collapsed but expansible air bag in each pocket, cover plates overlying said pockets, means securing said plates at their inner ends to the upper end of the teat cup on opposite sides of the latter, and means preventing upward movement of said plates without restricting movement thereof with inward deformation of the upper end of the cup at opposite sides.

2. A device as in claim 1; said last named means comprising an ear on each plate projecting outwardly beyond the sheath, and a link pivotally connected between said ear and the sheath at a point therebelow.

3. A device as in claim 1; said plate securing means comprising a segmental bead projecting outwardly from said opposite sides of the cup, and an upturned flange on each plate releasably and frictionally engaging between the corresponding bead and the cup.

4. A teat cup unit comprising an elongated teat cup of flexible and resilient material, a rigid sheath surrounding said cup from substantially end to end thereof, the upper portion of the cup being circular in cross section and the corresponding portion of the sheath being shaped to form pockets on opposite sides of the unit between the cup and sheath, a normally collapsed but expansible air bag in each pocket, and an air tube for each bag, the sheath having an opening adjacent each bag and the corresponding tube extending therethrough and connected with said bag.

5. A device as in claim 4 including protector sleeves on the sheath and surrounding the tubes for some distance beyond said sheath.

ISAURO V. DA SILVEIRA.